United States Patent
Te Kronnie et al.

[15] 3,659,346
[45] May 2, 1972

[54] POSITION DISPLAY METHOD AND DEVICE

[72] Inventors: Gerrit Hendrik Te Kronnie; Karel Hero Volkers, both of Van Breestraat 171, Amsterdam; Poul Albert Poulsen, Bezuidenhontseweg 74, Wassenaar, all of Netherlands

[22] Filed: May 13, 1969

[21] Appl. No.: 824,193

[30] Foreign Application Priority Data

May 16, 1968 Netherlands..........................6806926

[52] U.S. Cl.....................................................33/65, 33/67
[51] Int. Cl......................................................G01c 21/22
[58] Field of Search..........................33/65, 63, 64 A, 66, 67; 353/11

[56] References Cited

UNITED STATES PATENTS

| | | | |
|---|---|---|---|
| 1,779,818 | 10/1930 | Longyear | 33/65 X |
| 2,419,597 | 4/1947 | Rushmore | 33/65 |
| 3,016,791 | 1/1962 | Van Inwagen | 353/11 |

FOREIGN PATENTS OR APPLICATIONS

| | | | |
|---|---|---|---|
| 580,315 | 8/1924 | France | 33/66 |
| 687,281 | 4/1930 | France | |
| 1,450,588 | 7/1966 | France | |

*Primary Examiner*—Robert B. Hull
*Attorney*—Arthur B. Colvin

[57] ABSTRACT

A method and device for displaying on a chart the position and orientation of a relatively large moving vehicle, such as a ship, in which the chart is moved so as to bring three selected points thereof on the lines of sight from an observation station on the vehicle to three remote objects corresponding to such selected points, and in which an outline projection of the vehicle at the scale of the chart is made visible on the chart, said projection having a fixed orientation with respect to the vehicle itself.

4 Claims, 2 Drawing Figures

PATENTED MAY 2 1972 3,659,346
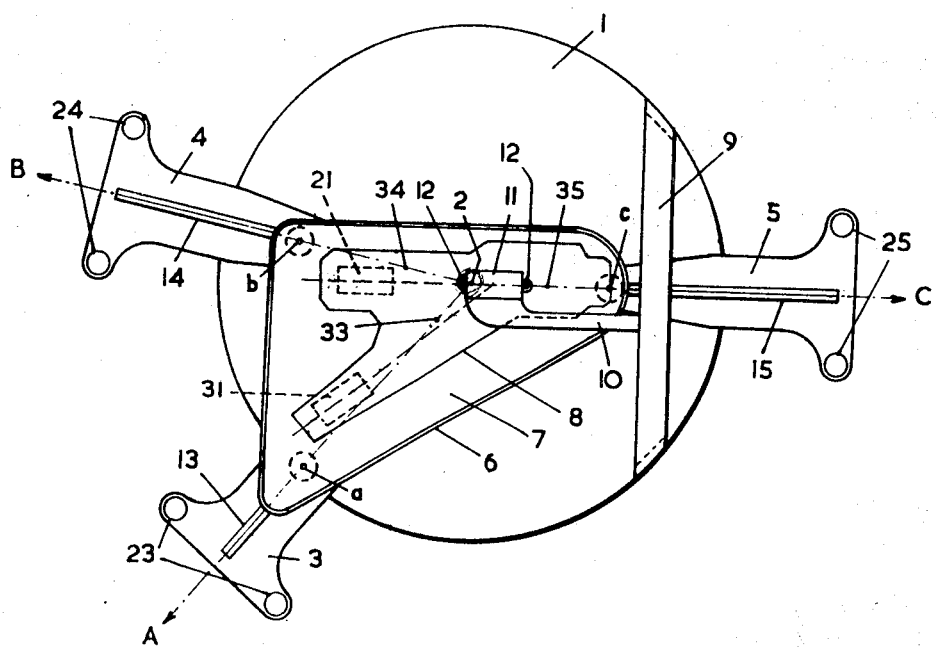
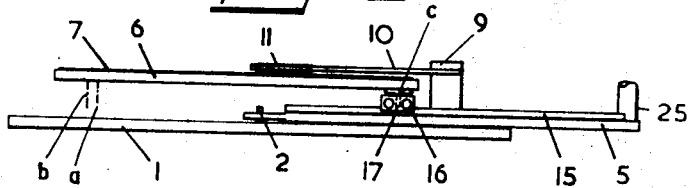
INVENTORS
GERRIT HENDRIK TE KRONNIE
KAREL HERO VOLKERS
POUL ALBERT POULSEN
BY

POSITION DISPLAY METHOD AND DEVICE

This invention relates to a method and device for displaying on a chart the position of a moving vehicle. More particularly, it relates to a method for that purpose according to which, from a fixed observation point on the vehicle, the lines of sight to three remote objects appearing on the chart are determined simultaneously, and the chart is so moved with respect to the set of slighting lines that the points of the chart which correspond to such remote objects, are made to lie on the respective lines of sight. The invention relates also to a device for performing such method.

Methods and apparatuses for determining, intermittently or continuously, in the manner indicated, the position of the observation point with respect to the environment as depicted on the chart, are well known in the art. Compare for instance the French patent specification 1,450,588. A radiographic plotting device working along the same basic principle, and in which the determination of the sighting lines and the adjustment of the chart in response thereto are performed automatically, is also known from the French patent specification 687,281. In these prior art devices the vehicle whose position it is desired to know, generally has negligible dimensions compared to the details appearing on the chart. Information as regards the momentary orientation of the vehicle itself is either not essential at all or can be derived directly from the course plotted on the chart, as in the case of an aircraft.

Such orientation is of vital importance, however, if big objects, such as ships, floating tunnel elements, dredgers and the like, must be transported in waterways with local shallows, narrowings, constructions and like obstacles. Free space for maneuvers may then be very limited. It is often desirable, therefore, to have the track of the vehicle recorded on a large scale chart which may serve as evidence in the handling of claims for damage caused during transport or for similar purposes.

Up to now, it has been common practice e.g., in transporting prefabricated tunnel elements, to photograph from time to time the vehicle and its environment from various on-shore positions simultaneously and to reconstruct the track in a chart from such photographs. Apart from being cumbersome and expensive, this method is disadvantageous in that the record only becomes available a relatively long time after the actual transport.

The invention, accordingly, has for its object to provide a method and device which are based on the above indicated principle of simultaneous resection of three reference points, and which make the position and orientation of the vehicle with respect to the environment directly visible and recordable.

The method according to the invention is characterized by the step of projecting on the chart an outline of the vehicle at the same scale as the chart, which projection has a fixed orientation relative to the vehicle, in such a position, that the point of the outline projection corresponding to the fixed observation point on the vehicle coincides with the intersection of the lines of sight.

In order to obtain a permanent visual record of the track followed by the vehicle the position of the outline projection can, from time to time, be marked on the chart, by conventional mechanical means or by hand.

A plotting device according to the invention comprises three sighting arms, each provided with a visual sighting means, and these arms are pivotable about a common vertical spindle. Moreover, each arm has a guide member extending horizontally along the sighting line and along which a support member is freely slidable. The three support members support a horizontal table in three selectable points for carrying a chart. The connection of the support members to the chart table is such that the table is freely rotatable relative to each of the three arms.

According to a characteristic feature of the present invention means are furthermore provided permitting an outline of the vehicle at the same scale as the chart to be projected onto the chart in the region of said vertical spindle in a manner such that the projection has a fixed orientation relative to the vehicle. In a preferred embodiment of the device a support arm having a fixed position with respect to the vertical spindle extends over the chart table into the region of the vertical spindle and has means to attach an outline model of the vehicle thereto.

The invention will be explained with reference to the accompanying drawing which shows, by way of example, one form of the device according to the invention.

FIG. 1 is a diagrammatic top plan view of the device;

FIG. 2 is a side view of the same device, with two of the sighting arms omitted for the sake of clarity.

A base plate 1 which is to be positioned horizontally at the observation station in fixed relation to the moving vehicle, is provided with a vertical spindle 2 at its center. About this spindle, three sighting arms, 3, 4 and 5 are individually pivotable. Each arm is provided with suitable sighting means 23, 24 or 25 which may be of any known type and should permit an observer to bring the center line of the arm in exact alignment with a selected distant object. In the embodiment shown double sighting means have been used for each arm which are both placed slightly off-axis. In this way it can be avoided that small objects near by the instrument, such as window pillars, could obstruct the field of view.

The sighting arms are provided with guide rails 13, 14 or 15 of T-shaped cross section which extend along the lines of sight 33, 34, 35. Over these rails small carriages are freely movable, of which only one, designated 16, which is associated with the sighting arm 5, is seen in FIG. 2. Carriage 16 has a central bearing for a rotatable vertical pin 17 whose axis intersects the center line 35 of the arm 5.

Pin 17, together with similar pins associated with the two other carriages, supports a chart table 6. They are removably attached to the lower surface of the table 6 so that their center lines go through selected points $a$, $b$, $c$ of the chart 7 which is disposed on the table 6. The chart 7 may display at a desired scale, e.g., a water basin 8 in which a floating vehicle, such as a tunnel element, has to be hauled from the position indicated by dotted lines at 21 to the position shown at 31.

A bridge member 9 is fixed to the base plate 1 and supports a horizontal cross arm 10 on whose free end an outline model 11 of the vehicle is mounted. To avoid parallax errors, the distance from the model to the chart is preferably made as small as possible. The model has the same scale as the chart 7 and the same orientation as the vehicle itself. Moreover, the point on the model corresponding to the observation station on the vehicle, that is the place where the instrument is situated, is placed in the vertical axis of the spindle 2.

At opposite ends of the outline model 11 holders 12 are provided in which some marking means, such as pencils, can be inserted to enable the operator to mark from time to time the position of the model on the chart.

The positions $a$, $b$, $c$ on the chart in which the pin 17 and similar pins associated with the outer sighting arms are attached, correspond to well-defined and clearly visible remote objects A, B and C in the terrain, as indicated by the arrows.

If three observers take care during the transport, that the sighting arms 3, 4 and 5 remain sighted on the objects A, B and C, respectively, the table 6 and the chart 7 supported thereby will necessarily be moved so that the outline model 11, or its vertical projection on the chart 7, has always the same position and orientation with respect to the chart, as the vehicle has relative to the terrain.

By actuating, from time to time, the pencils in the holders 12 the momentary position of the vehicle can be recorded on the chart and the time can be added to such marks so as to obtain a permanent record of the complete operation in a simple manner.

It will be evident that many deviations are possible, without leaving the domain of the present invention, from what has been described and shown in the drawing.

More particularly, the projection of the outline model on the chart can be achieved with optical means, such as an optical projector, instead of by mounting the model over the chart in closed parallel relation thereto. Also an image of the chart and model could be transmitted to a central plotting room by closed circuit television so as to facilitate the operation commander's control of the movement of the vehicle. Finally, it is possible to separate the sighting system from the remainder of the instrument by providing suitable mechanical or electrical means to transfer the angular position of each sight to the associated arm. Thus, the sighting system may be mounted on the vehicle deck where as the remainder of the instrument is situated, e.g., in a chart room.

What we claim is: specific

1. Method for displaying on a chart the specific overall area of the chart occupied by a moving vehicle, comprising the steps of: determining simultaneously the lines of sight from a fixed observation point on the vehicle to three remote objects appearing on the chart; moving the chart with respect to the set of sighting lines so determined in such manner that the points on the chart which correspond to such remote objects are made to lie on the respective lines of sight, and juxtaposing on the chart an outline of the vehicle at the same scale as the chart, which outline has a fixed orientation relative to the vehicle, in such a position that the point of the outline corresponding to the fixed observation point on the vehicle is in registry with the intersection of the lines of sight.

2. Device for displaying on a chart the position of a moving vehicle, comprising: a vertical spindle; three arms pivotable about said spindle; a visual sighting means associated with each of said arms permitting the same to be aligned with respect to a distant object; a guide member on each of said arms extending horizontally along the line of sight thereof; a chart table for carrying a chart; three support members for supporting said chart table in selectable points, each of said support members being freely movable along an associated one of said guide members and being so connected to said chart table as to permit pivotal movements of said chart table about the vertical axes through the selectable points, and display means for juxtaposing an outline of the vehicle having a fixed orientation relative to the vehicle at the same scale as the chart substantially on the chart in the region of the spindle with the point of the outline corresponding to the fixed observation point on the vehicle in registry with the intersection of the lines of sight so that the relative position of the vehicle and the direct environment is indicated by the relative position of the outline and the chart.

3. Device as set forth in claim 2, wherein a support arm having a fixed position with respect to said spindle extends over the chart table into the region of said spindle, said support arm having means to attach an outline model of the vehicle thereto.

4. The device of claim 3 wherein said outline model includes marking means in predetermined position to said model corresponding to the extremities of said vehicle, whereby markings effected through the use of said marking means record the corresponding positions of said extremities of said vehicle on said chart.

* * * * *